US010203706B2

(12) United States Patent
Davies

(10) Patent No.: US 10,203,706 B2
(45) Date of Patent: Feb. 12, 2019

(54) METHOD AND APPARATUS FOR CONDITIONAL CONTROL OF AN ELECTRONIC PRESSURE REGULATOR

(71) Applicant: TESCOM CORPORATION, Elk River, MN (US)

(72) Inventor: Steven Craig Davies, Swansea (GB)

(73) Assignee: TESCOM CORPORATION, Elk River, MN (US)

( * ) Notice: Subject to any disclaimer, the term of this patent is extended or adjusted under 35 U.S.C. 154(b) by 780 days.

(21) Appl. No.: 14/290,528

(22) Filed: May 29, 2014

(65) Prior Publication Data

US 2014/0358289 A1 Dec. 4, 2014

Related U.S. Application Data

(60) Provisional application No. 61/830,350, filed on Jun. 3, 2013.

(51) Int. Cl.
*G05B 19/045* (2006.01)
*G05D 16/20* (2006.01)

(52) U.S. Cl.
CPC ..... *G05D 16/2093* (2013.01); *G05D 16/2053* (2013.01)

(58) Field of Classification Search
CPC ........... G05D 16/2093; G05D 16/2053; G05B 19/045
USPC ....................................................... 700/275
See application file for complete search history.

(56) References Cited

U.S. PATENT DOCUMENTS

| | | | | |
|---|---|---|---|---|
| 5,047,965 A * | 9/1991 | Zlokovitz | .......... | G05D 16/2093 137/487 |
| 5,142,483 A * | 8/1992 | Basham | ............. | G05D 16/2053 700/281 |
| 5,682,878 A * | 11/1997 | Ogden | .................. | A61M 16/00 128/204.18 |
| 5,782,296 A * | 7/1998 | Mehta | ................ | G05D 23/1904 165/268 |
| RE36,300 E | 9/1999 | Gonzalez | | |
| 6,360,355 B1 * | 3/2002 | Nishida | ............... | G06F 17/5045 716/103 |
| 7,562,308 B2 * | 7/2009 | Pradhan | .............. | G06F 3/04847 715/721 |

(Continued)

FOREIGN PATENT DOCUMENTS

| | | |
|---|---|---|
| CN | 1271431 A | 10/2000 |
| CN | 1491376 A | 4/2004 |

(Continued)

OTHER PUBLICATIONS

Hyesoon Kim et al., Wish Branch: A New Control Flow Instruction Combining Conditional Branching and Predicated Execution, Feb. 2005, Microprocessor Research Labs Intel Corporation Hillsboro, OR 97124, 26 pages.*

(Continued)

*Primary Examiner* — Chun Cao
(74) *Attorney, Agent, or Firm* — Marshall, Gerstein & Borun LLP

(57) ABSTRACT

An intelligent pressure regulator in a process control system is controlled according to a profile constructed by a user on a computer connected to the device. The profile is a multi-step command sequence. The profile includes at least one conditional statement and, optionally, at least one branching statement. That is, the profile includes at least one statement that, depending on whether the statement is true or false, causes the device to execute a first command or a second (Continued)

command, respectively. The profile may also include a statement (e.g., a "goto" statement) that causes the device to skip one or more commands in the profile.

41 Claims, 11 Drawing Sheets

(56) References Cited

U.S. PATENT DOCUMENTS

| | | |
|---|---|---|
| 2002/0017286 A1 | 2/2002 | Rice et al. |
| 2007/0084512 A1 | 4/2007 | Tegge et al. |
| 2009/0188938 A1* | 7/2009 | Farris .................. B67D 1/0018 222/1 |
| 2012/0012567 A1* | 1/2012 | Retnaswamy ......... B23K 9/013 219/121.55 |
| 2013/0071824 A1* | 3/2013 | Krauza .................. A63B 26/00 434/247 |
| 2013/0153041 A1* | 6/2013 | Kucera .................. F23N 1/005 137/14 |

FOREIGN PATENT DOCUMENTS

| | | |
|---|---|---|
| CN | 201568580 U | 9/2010 |
| DE | 102004037064 A1 | 2/2006 |
| RU | 2276397 C2 | 5/2006 |

OTHER PUBLICATIONS

International Search Report issued in PCT/US2014/040600 dated Dec. 2, 2014.
Written Opinion issued in PCT/US2014/040600 dated Dec. 2, 2014.
International Preliminary Report on Patentability issued in Application No. PCT/US2014/040600 dated Dec. 8, 2015.
Office Action issued in Russian Patent Application No. 2015156470 dated Dec. 8, 2017.
Office Action issued in Chinese Patent Application No. 201410240444.2 dated Oct. 24, 2017.
Office Action issued in Chinese Patent Application No. 201410240444.2 dated Jul. 19, 2018.
Partial International Search Report issued in PCT/US2014/040600 dated Oct. 7, 2014.

* cited by examiner

METHOD AND APPARATUS FOR CONDITIONAL CONTROL OF AN ELECTRONIC PRESSURE REGULATOR

RELATED APPLICATIONS

This is a regular filed application that claims priority to and the benefit of the filing date of U.S. Provisional Patent Application Ser. No. 61/830,350, entitled "Method and Apparatus for conditional Control of an Electronic Pressure Regulator" which was filed on Jun. 3, 2013, the entire disclosure of which is hereby expressly incorporated by reference herein for all purposes.

FIELD OF THE DISCLOSURE

The present disclosure is directed to process control systems and, more particularly, field devices such pressure regulators and pilot loading mechanisms for pressure regulators used in process control systems.

BACKGROUND

Process control systems, such as distributed or scalable process control systems like those used in chemical, petroleum or other processes, typically include one or more process controllers communicatively coupled to at least one host or user workstation and to one or more field devices via analog, digital or combined analog/digital buses. The field devices, which may include, for example, control valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, and uses this information to implement a control routine to generate control signals, which are sent over the buses to the field devices to control the operation of the process. Information from each of the field devices and the controller is typically made available to one or more applications executed by the user workstation to enable an operator to perform any desired function regarding the process, such as viewing the current state of the process, modifying the operation of the process, etc. In the event that a field device fails, the operational state of the entire process control system can be jeopardized.

Field devices in a process plant include, in some instances, pressure regulators. The pressure regulators may be used by themselves to regulate the pressure of a gas, or may be used in combination with a pneumatically powered actuator actuating a valve. Electronic pressure regulators may be controlled by external programmable logic controllers or by on-board programming.

SUMMARY

An electronic pressure regulator includes a regulator body having an inlet port coupled to a source of supply pressure, an outlet port for outputting a controlled pressure, and an exhaust port. An inlet valve is coupled at an input of the inlet valve to the supply pressure and at an output of the inlet valve to the outlet port. An outlet valve is coupled at an input of the outlet valve to the outlet port and at an output of the outlet valve to the exhaust port. A controller disposed within the regulator body is operable to actuate the inlet valve and the outlet valve to adjust the controlled pressure delivered to the outlet port. The controller includes a processor programmed to receive and execute a multi-step command sequence that includes a conditional statement causing the processor to execute a first command if the conditional statement evaluates to true and a second command if the conditional statement evaluates to false.

A method of controlling an electronic pressure regulator includes receiving at a processor disposed within a body of the regulator, via an electronic connection, a multi-step command sequence, programming the processor to execute the multi-step command sequence, and executing the multi-step command sequence. The multi-step command sequence includes a conditional statement that causes the processor to execute a first command if the conditional statement evaluates to true and a second command if the conditional statement evaluates to false.

A computer-implemented method of programming an electronic pressure regulator includes receiving a selection of a plurality of commands selected from a set of available commands. The plurality of commands is selected to form a multi-step command sequence. For each of the plurality of selected commands, the method includes receiving at least one user-defined value, and associating the received user-defined values with the corresponding selected commands. The method also includes receiving a selection, as one of the plurality of commands, of a conditional statement, receiving for the conditional statement a selection of a parameter and a parameter value, and associating the received parameter and the received parameter value with the conditional statement. The method further includes receiving a selection, as one of the plurality of commands, of a first command to be executed if the conditional statement evaluates to true, and receiving a selection, as one of the plurality of commands, of a second command to be executed if the conditional statement evaluates to false. Still further, the method includes programming the electronic pressure regulator to execute the multi-step command sequence.

DETAILED DESCRIPTION

The present disclosure is directed to an intelligent pilot loading mechanism for a field device of a process control system such as a pressure regulator, for example, and, specifically, to methods of implementing control of the device and of programming the device. In particular, a device according to the present disclosure is capable of executing a profile constructed by a user on a computer connected to the device. The profile is a multi-step command sequence. The profile includes at least one conditional statement and/or at least one branching statement. That is, the profile includes at least one statement that, depending on whether the statement is true or false, causes the device to execute a first command or a second command, respectively. The profile may also include a statement (e.g., a "goto" statement) that causes the device to skip one or more commands in the profile.

Figure 1:
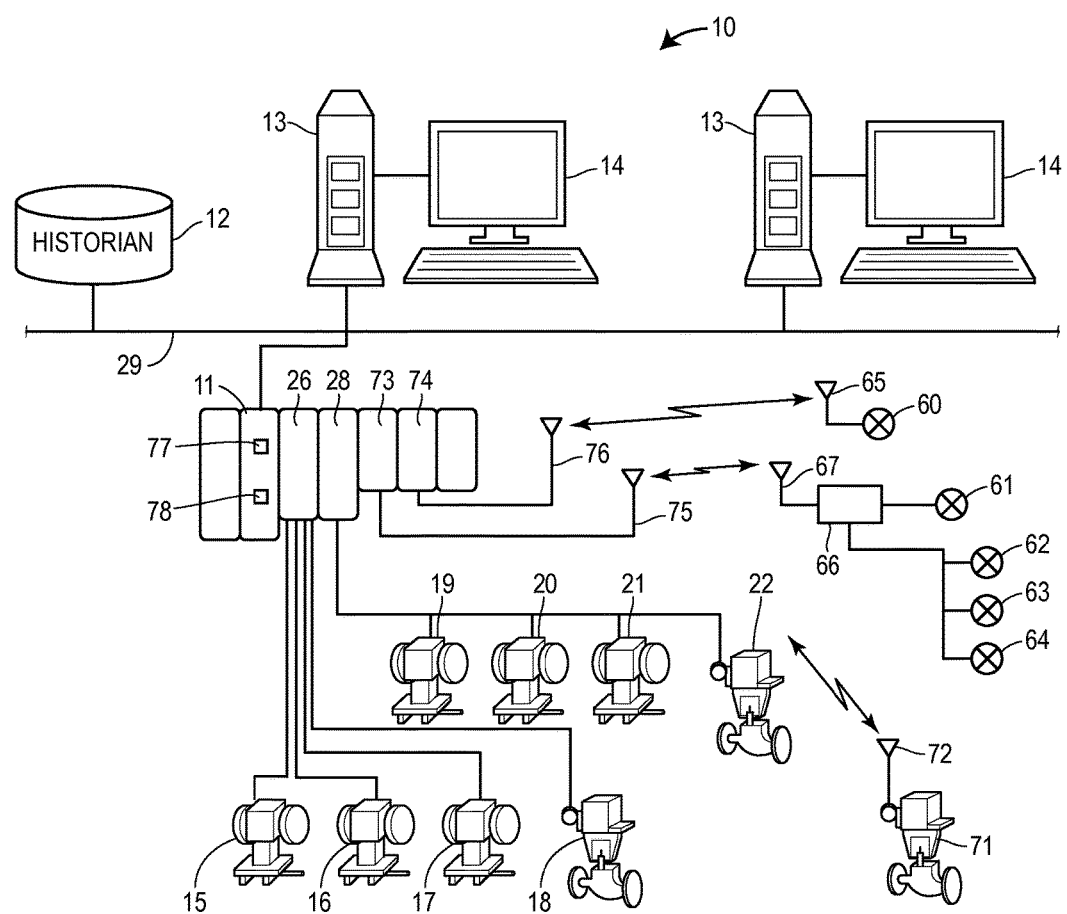
FIG. 1 is a schematic representation of a process control system having one or more intelligent regulator assemblies constructed in accordance with the principles of the present disclosure.

Referring now to FIG. 1, a process control system 10 constructed in accordance with one version of the present disclosure is depicted incorporating one or more field devices 15, 16, 17, 18, 19, 20, 21, 22, and 71 in communication with a process controller 11, which in turn, is in communication with a data historian 12 and one or more user workstations 13, each having a display screen 14. So configured, the controller 11 delivers signals to and receives signals from the field devices 15, 16, 17, 18, 19, 20, 21, 22, and 71 and the workstations 13 to control the process control system.

In additional detail, the process controller 11 of the process control system 10 of the version depicted in FIG. 1 is connected via hardwired communication connections to field devices 15, 16, 17, 18, 19, 20, 21, and 22 via input/output (I/O) cards 26 and 28. The data historian 12 may be any desired type of data collection unit having any desired type of memory and any desired or known software, hardware or firmware for storing data. Moreover, while the data historian 12 is illustrated as a separate device in FIG. 1, it may instead or in addition be part of one of the workstations 13 or another computer device, such as a server. The controller 11, which may be, by way of example, a DeltaV™ controller sold by Emerson Process Management, is communicatively connected to the workstations 13 and to the data historian 12 via a communication network 29 which may be, for example, an Ethernet connection.

As mentioned, the controller 11 is illustrated as being communicatively connected to the field devices 15, 16, 17, 18, 19, 20, 21, and 22 using a hardwired communication scheme which may include the use of any desired hardware, software and/or firmware to implement hardwired communications, including, for example, standard 4-20mA communications, and/or any communications using any smart communication protocol such as the FOUNDATION® Fieldbus communication protocol, the HART® communication protocol, etc. The field devices 15, 16, 17, 18, 19, 20, 21, and 22 may be any types of devices, such as sensors, control valve assemblies, transmitters, positioners, etc., while the I/O cards 26 and 28 may be any types of I/O devices conforming to any desired communication or controller protocol. In the embodiment illustrated in FIG. 1, the field devices 15, 16, 17, 18 are standard 4-20mA devices that communicate over analog lines to the I/O card 26, while the digital field devices 19, 20, 21, 22 can be smart devices, such as HART® communicating devices and Fieldbus field devices, that communicate over a digital bus to the I/O card 28 using Fieldbus protocol communications. Of course, the field devices 15, 16, 17, 18, 19, 20, 21, and 22 may conform to any other desired standard(s) or protocols, including any standards or protocols developed in the future.

In addition, the process control system 10 depicted in FIG. 1 includes a number of wireless field devices 60, 61, 62, 63, 64 and 71 disposed in the plant to be controlled. The field devices 60, 61, 62, 63, 64 are depicted as transmitters (e.g., process variable sensors) while the field device 71 is depicted as a control valve assembly including, for example, a control valve and an actuator. Wireless communications may be established between the controller 11 and the field devices 60, 61, 62, 63, 64 and 71 using any desired wireless communication equipment, including hardware, software, firmware, or any combination thereof now known or later developed. In the version illustrated in FIG. 1, an antenna 65 is coupled to and is dedicated to perform wireless communications for the transmitter 60, while a wireless router or other module 66 having an antenna 67 is coupled to collectively handle wireless communications for the transmitters 61, 62, 63, and 64. Likewise, an antenna 72 is coupled to the control valve assembly 71 to perform wireless communications for the control valve assembly 71. The field devices or associated hardware 60, 61, 62, 63, 64, 66 and 71 may implement protocol stack operations used by an appropriate wireless communication protocol to receive, decode, route, encode and send wireless signals via the antennas 65, 67 and 72 to implement wireless communications between the process controller 11 and the transmitters 60, 61, 62, 63, 64 and the control valve assembly 71.

If desired, the transmitters 60, 61, 62, 63, 64 can constitute the sole link between various process sensors (transmitters) and the process controller 11 and, as such, are relied upon to send accurate signals to the controller 11 to ensure that process performance is not compromised. The transmitters 60, 61, 62, 63, 64, often referred to as process variable transmitters (PVTs), therefore may play a significant role in the control of the overall control process. Additionally, the control valve assembly 71 may provide measurements made by sensors within the control valve assembly 71 or may provide other data generated by or computed by the control valve assembly 71 to the controller 11 as part of its operation. Of course, as is known, the control valve assembly 71 may also receive control signals from the controller 11 to effect physical parameters, e.g., flow, within the overall process.

The process controller 11 is coupled to one or more I/O devices 73 and 74, each connected to a respective antenna 75 and 76, and these I/O devices and antennas 73, 74, 75, 76 operate as transmitters/receivers to perform wireless communications with the wireless field devices 61, 62, 63, 64 and 71 via one or more wireless communication networks. The wireless communications between the field devices (e.g., the transmitters 60, 61, 62, 63, 64 and the control valve assembly 71) may be performed using one or more known wireless communication protocols, such as the WirelessHART® protocol, the Ember protocol, a WiFi protocol, an IEEE wireless standard, etc. Still further, the I/O devices 73 and 74 may implement protocol stack operations used by these communication protocols to receive, decode, route, encode and send wireless signals via the antennas 75 and 76 to implement wireless communications between the controller 11 and the transmitters 60, 61, 62, 63, 64 and the control valve assembly 71.

As illustrated in FIG. 1, the controller 11 conventionally includes a processor 77 that implements or oversees one or more process control routines (or any module, block, or sub-routine thereof) stored in a memory 78. The process control routines stored in the memory 78 may include or be associated with control loops being implemented within the process plant. Generally speaking, and as is generally known, the process controller 11 executes one or more control routines and communicates with the field devices 15, 16, 17, 18, 19, 20, 21, 22, 60, 61, 62, 63, 64, and 71, the user workstations 13 and the data historian 12 to control a process in any desired manner(s). Additionally, any one of the field devices 18, 22, and 71 in FIG. 1, each of which is depicted as a control valve assembly, can include an intelligent control valve actuator constructed in accordance with the principles of the present disclosure for communicating with the process controller 11 in order to facilitate monitoring of the actuator's health and integrity.

Figure 2:
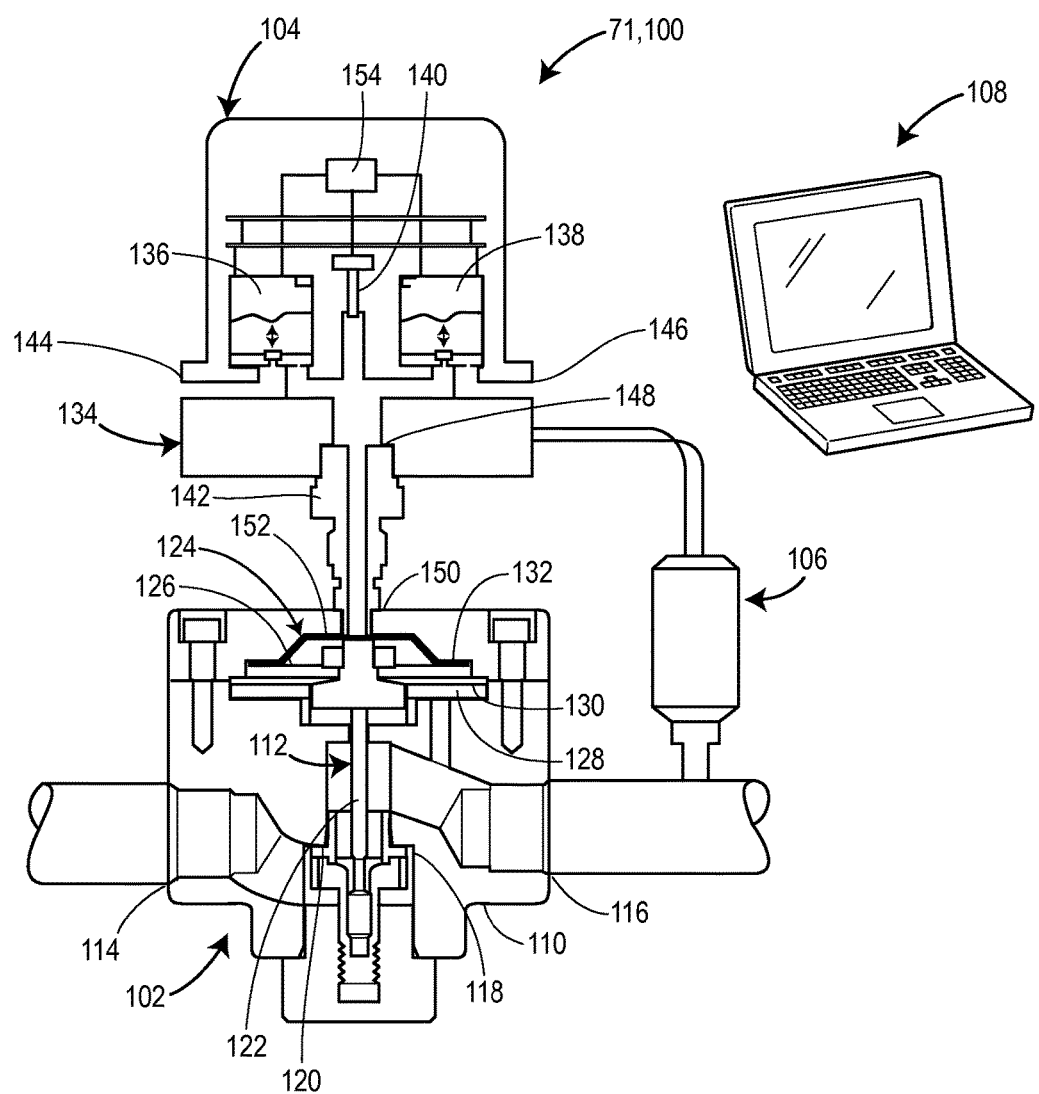
FIG. 2 is a cross-sectional side view of one version of an intelligent regulator assembly constructed in accordance with the principles of the present disclosure.

Referring now to FIG. 2, for the sake of description, field device 71 from FIG. 1 is shown as an intelligent regulator assembly 100 constructed in accordance with the principles of the present disclosure. In FIG. 2, the intelligent regulator assembly 100 includes a regulator 102, a pilot device 104, and a feedback pressure sensor 106. Additionally, FIG. 2 depicts an optional personal computing device 108 communicatively coupled to the pilot device 104 to enable user interaction with the pilot device 104, as will be described.

The regulator 102 includes a valve body 110 and a control assembly 112. The valve body 110 defines an inlet 114, an outlet 116, and a gallery 118 defining a seating surface 120. The control assembly 112 is carried within the valve body 110 and includes a control element 122 operably connected to a diaphragm assembly 124. The control element 122 is movable between a closed position in sealing engagement with the seating surface 120 and an open position spaced away from the seating surface 120 in response to pressure changes across the diaphragm assembly 124. As depicted, the diaphragm assembly 124 includes a diaphragm 126 disposed within a diaphragm cavity 128 of the valve body 110 of the regulator 102. A bottom surface 130 of the diaphragm 126 is in fluid communication with the outlet 116 of the valve body 110 and a top surface 132 of the diaphragm 126 is in fluid communication with the pilot device 104 via a pilot opening 150 in the valve body 110.

The pilot device 104 includes a valve body 134, an inlet valve 136, an exhaust valve 138, a pressure sensor 140, and an outlet adaptor 142. The valve body 134 defines an inlet port 144, an exhaust port 146, and an outlet port 148. The inlet port 144 is adapted to be connected to a source of supply gas for loading the dome 152 of the regulator 102, as will be described. As depicted, the inlet valve 136 is disposed adjacent to the inlet port 144, the exhaust valve 138 is disposed adjacent to the exhaust port 146, and the outlet adaptor 142 extends from the outlet port 148 and to the pilot opening 150 in the valve body 110. Thus, the outlet adaptor 142 provides fluid communication between the pilot device 104 and the regulator 102. The pressure sensor 104 is disposed in the valve body 134 of the pilot device 104 at a location between the inlet and outlet valves 136, 138. As such, the pressure sensor 140 is operable to sense the pressure between the inlet and outlet valves 136, 138, as well as in the outlet port 148, the outlet adaptor 142, and the diaphragm cavity 128 adjacent to the top surface 132 of the diaphragm 126. This portion of the diaphragm cavity 128 can be referred to as the dome 152 of the regulator 102. In one version of the pilot device 104 the inlet and exhaust valves 136, 138 can be solenoid valves such as Pulse Width Modulation (PWM) solenoid valves and the pressure sensor 104 can be a pressure transducer. Moreover, the inlet and exhaust valves 136, 138 and the pressure sensor 104 can be communicatively coupled to an on-board controller 154, which can store logic and/or direct some or all of the functionality of the pilot device 104, as will be described below.

Still referring to FIG. 2, the feedback pressure sensor 106 of the assembly 100 includes a pressure transducer arranged to detect the pressure at the outlet 116 of the regulator 102 and transmit signals to the pilot device 104 and, more particularly, to the on-board controller 154 of the pilot device 104. Based on the signals received by the on-board controller 154 from the feedback pressure sensor 106, the pilot device 104 opens and/or closes the inlet and exhaust valves 136, 138 to control the pressure in the dome 152 of the regulator 102, which in turn, controls the position of the control element 122 and ultimately the pressure at the outlet 116 of the regulator 102.

Specifically, during normal operation, the pressure at the outlet 116 of the regulator 102 is controlled and maintained as desired by adjusting the pressure in the dome 152 of the regulator 102. This is achieved via operation of the pilot device 104 and feedback pressure sensor 106. For example, in one version, the feedback pressure sensor 106 detects the pressure at the outlet 116 every 25 milliseconds and transmits a signal to the on-board controller 154 of the pilot device 104. The on-board controller 154 compares this signal, which is indicative of the pressure at the outlet 116, to a desired set-point pressure and determines if the outlet pressure is less than, equal to, or greater than the set-point pressure. Based on this determination, the pilot device 104 manipulates either or both of the inlet and exhaust valves 136, 138 to adjust the pressure in the dome 152. That is, if the sensed outlet pressure is lower than the desired set-point pressure, the on-board controller 154 activates the inlet valve 136 (e.g., instructs the inlet valve 136 to open and the exhaust valve 138 to close). In this configuration, gas enters the inlet port 144 of the pilot device 104 and increases the pressure in the dome 152, which causes the diaphragm assembly 124 to urge the control element 122 downward relative to the orientation of FIG. 2, which opens the regulator 102 and increases flow and ultimately pressure at the outlet 116. In contrast, if the pressure sensed at the outlet 116 by the feedback pressure sensor 106 is determined to be higher than the desired set-point pressure, the on-board controller 154 activates the exhaust valve 138 (e.g., instructs the exhaust valve 138 to open and the inlet valve 136). In this configuration, gas in the dome 152 exhausts out through the exhaust port 146 of the pilot device 104 to decrease the pressure on the top surface 132 of the diaphragm 126. This allows the outlet pressure to urge the diaphragm assembly 124 and control element 122 upward relative to the orientation of FIG. 2, which closes the regulator 102 and decreases flow and ultimately pressure at the outlet 116.

Based on the foregoing description, it should be appreciated that the pilot device 104 and the feedback pressure sensor 106 operate in combination with each other to intermittently, yet frequently, monitor the pressure at the outlet 116 of the regulator 102 and adjust the pressure in the dome 152 until the pressure at the outlet 116 is equal to the set-point pressure.

In embodiments, the personal computing device 108 described with reference to FIG. 2 includes one or more routines, embodied as computer-readable instructions stored on a memory device (e.g., volatile or non-volatile memory devices such as Flash memory, RAM, magnetic media, etc.) or other non-transitory computer-readable media (e.g., optical discs, etc.). The one or more routines may facilitate for a user of the personal computing device 108 interaction with the intelligent regulator 100. The personal computing device 108 (referred to interchangeably as a computer) may be communicatively coupled to the intelligent regulator 100 in any known method, including, by way of example, universal serial bus (USB), RS-232, RS-485, WiFi, Bluetooth, or any other suitable communication connection. In some embodiments, the connection between the computer 108 and the regulator 100 is temporary. For example, the computer 108 is connected to the regulator 100 to program the regulator 100, to download information from the regulator 100, to upload information to the regulator 100, to perform diagnostics on the regulator 100, etc. In other embodiments, the connection between the computer 108 and the regulator is permanent or semi-permanent. For example, the regulator may be coupled to the workstation 14 via the controller 11.

The computer 108 and, in particular, a processor of the computer 108 may execute the one or more routines to cause the processor to perform actions related to the configuration, management, maintenance, diagnosis, and/or operation of the regulator 100. For example, one of the routines may perform an automated tuning procedure on the regulator 100. One of the routines may facilitate manual tuning of the regulator 100. A routine may cause the processor to display a response of the regulator to one or more stimuli and, in embodiments, the displayed response may be graphical in nature (e.g., may be a plot screen). A routine may allow a user to program a setpoint of the regulator 100. Another routine may allow a user to adjust proportional, derivative, and/or integral values and/or integral limits and/or deadband parameters. Routines may allow a user to cause the regulator 100 to acquire and store data, and may allow a user to retrieve stored data from the regulator 100. Still another routine may allow a user to set up triggers to collect data in certain circumstances (e.g., when a particular pressure, error, or input signal reaches a threshold value). Other routines may allow a user to set control modes, perform calibration, set control limits, set diaphragm protection values, run diagnostic procedures (e.g., a solenoid leak test), and the like. Further, one or more routines may facilitate the use of profiles on the regulator 100.

Figure 3:
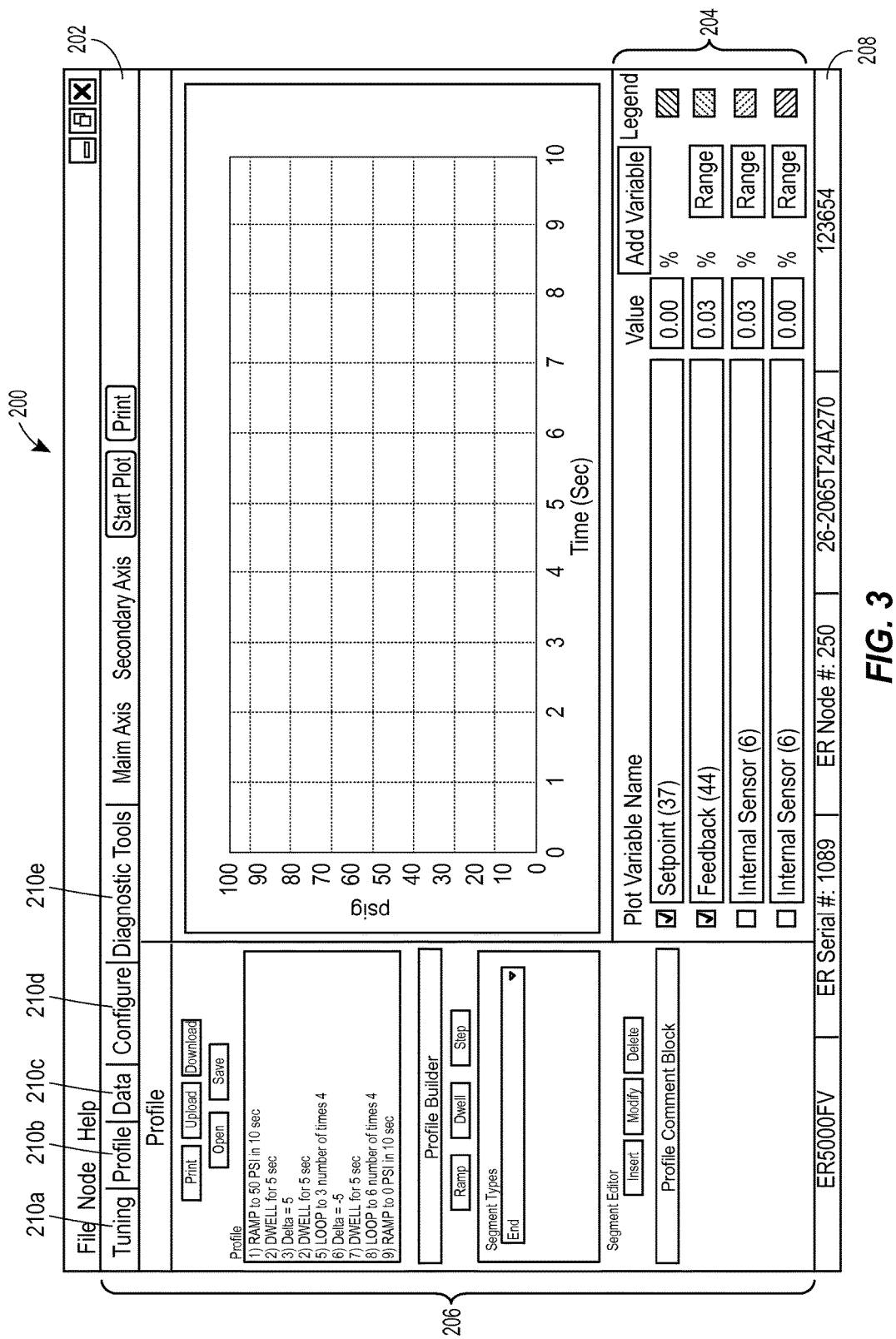
FIG. 3 is an example screen shot of a display for performing one or more interface operations with the intelligent regulator.

Turning to FIG. 3, an illustrative display 200 depicts a screen generated by the one or more routines operating on the computer 108. The display 200 depicts a plot screen 202, a set of plot screen variable controls 204, a functional tab area 206, and a footer area 208. The plot screen 202 provides a user with a precise visual display of moment-by-moment interaction between a setpoint setting of the regulator 100 and the response of the regulator 100 to the setpoint. Watching changes to PID parameters in real time can facilitate the tuning process. At the same time, the plot screen variable controls 204 facilitate the selection and control of the variables displayed in the plot screen 202. The plot screen variable controls 204 may allow the user to select the input sources to the regulator 100 that the user wishes to track and/or plot. In the display 200, the pot screen variable controls 204 indicate that setpoint and feedback data are plotted by default, and allows the user to select to track up to two additional variables.

The functional tab area 206 facilitates the implementation of and interaction with the various routines described above. For example, activation of a tab 210a (i.e., bringing to the foreground the information on the tab 210a) will display controls related to tuning the parameters of the regulator 100; activation of a tab 210b (as depicted in the display 200 of FIG. 3) will display controls related to using profiles with the regulator 100 (described in detail below); activation of a tab 210c will display controls related to tracking, recording, downloading, and performing other actions related to data of the regulator 100; activation of a tab 210d will display controls related to the configuration of the regulator 100; and activation of a tab 210e will display controls related to performing diagnostic routines on the regulator 100.

The footer area 208 displays information about the regulator 100 communicatively coupled to the computer 108 and on which the routines are currently operating. The information in the footer area 208 may include, for example, model information, serial number information, node address information, part number information, the unit currently communicating with the routines (e.g., where multiple regulators are connected in daisychain fashion, and the like.

As described above, the routines operating on the computer 108 may include a routine facilitating the use of profiles on the regulator 100. A profile is a multi-step command sequence that can be stored and/or executed by the on-board controller 154 of the regulator 100. The on-board controller 154, in various embodiments, comprises a multi-purpose processor operable to execute machine-readable instructions stored on a memory device of the on-board controller 154. In other embodiments, the controller 154 comprises a programmable logic device, such as an FPGA, a DSP, an ASIC, or the like. In any event, the profile allows the regulator 100 to self-regulate in situations such as start/stop operations, setpoint changes, etc. Profiles can be as simple as one command or as complex as hundreds of commands.

Figure 4:
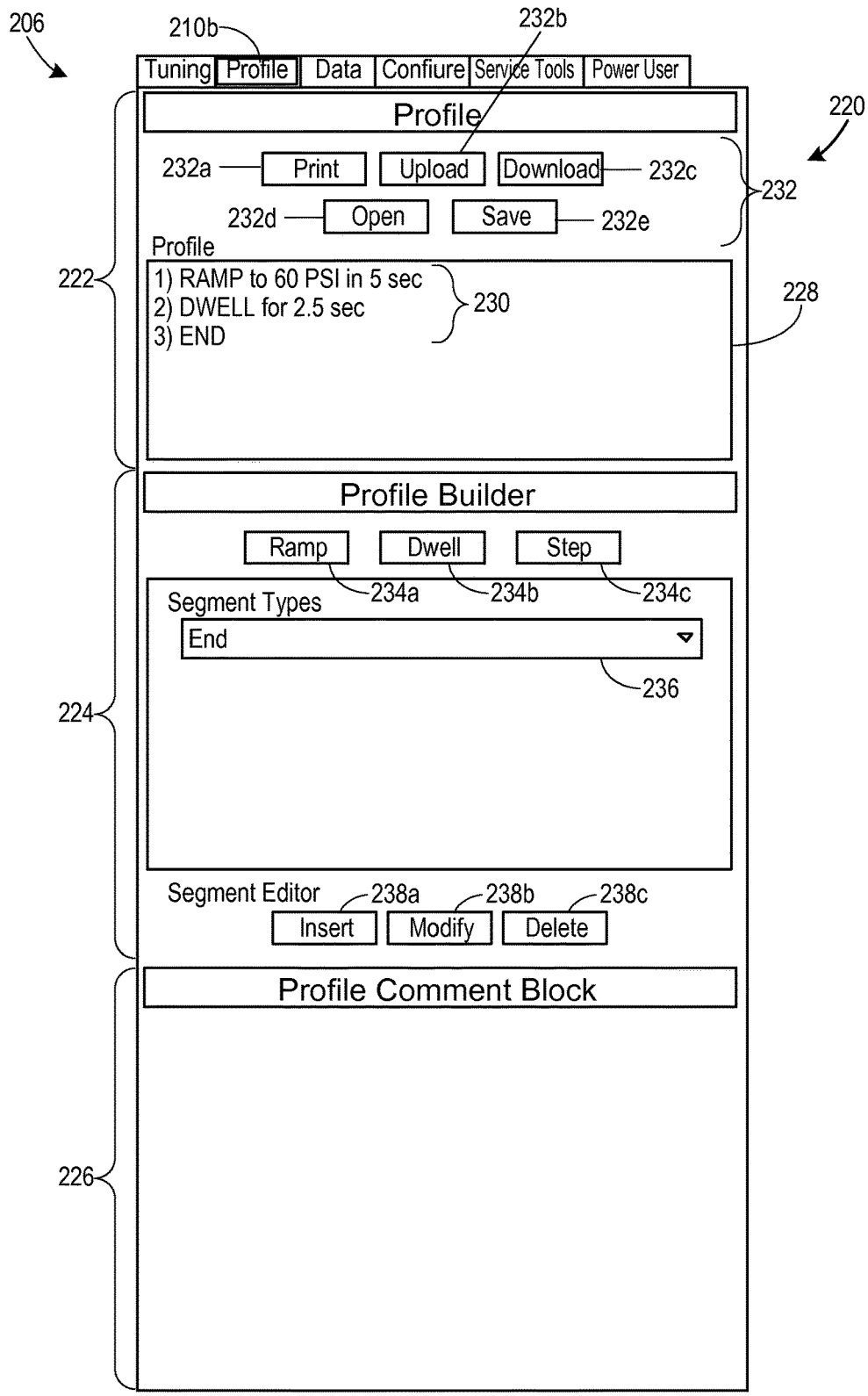
FIG. 4 is a detail view of a profile portion, including a profile builder panel, of the example screen shot of FIG. 3.

Turning now to FIG. 4, a detail view 220 of the functional tab area 206 is illustrated with the profile tab 210b selected. The profile tab 210b includes three panels: a profile panel 222, a profile builder panel 224, and a profile comment block panel 226. The profile panel 222 displays a currently loaded profile in a profile window 228. When a profile is loaded—retrieved from a memory on the computer 108 or from a memory on the regulator 100—the profile window 228 displays a command sequence 230 associated with the profile. In embodiments, each command in the multi-step command sequence is numbered or otherwise identified.

The profile panel 222 includes, in embodiments, controls 232 for performing various profile-related actions. In the view 220 of FIG. 4, the profile panel 222 includes a print control 232a that causes the processor to print the contents of the profile window 228 (i.e., to print the command sequence 230) to a connected printer (not shown). The profile panel also includes an upload control 232b and a download control 232c that cause the processor of the computer 108 to load a profile from the on-board controller 154 into the profile window 228 or to download the contents of the profile window 228 to the on-board controller 154, respectively. An open control 232d and a save control 232e cause the processor of the computer 108 to open (i.e., retrieve from a memory device) a previously saved profile (and display the profile in the profile window 228) or to save the contents of the profile window 228 to a memory device, respectively.

Referring still to FIG. 4, the profile comment block panel 226 allows a user to enter comments about the open profile. The comments may be helpful for other users (or the same user) to refer to at a later time, and may describe the function of the profile, the use case for the profile, etc.

The profile builder panel 224 facilitates creation and/or revision of profiles, one command at a time. In embodiments, each command is referred to as a segment, and is identified by a line number or other similar mechanism. A variety of segment types may facilitate the creation of a profile that performs a number of different actions. The profile builder panel 224 depicted in the view 220, includes three quick-access controls 234 and a segment selection control 236. Each of the quick-access controls 234 may be a commonly used profile segment type and, in embodiments, may serve to automatically select in the segment selection control 236 the desired, corresponding segment type. By way of example, the quick-access controls 234 include a Ramp control 234a, a Dwell control 234b, and a Step control 234c. Activating the Ramp control 234a may set the segment selection control 236 to Ramp, allowing the user to input a setpoint and a ramp time as described below. Similarly, activating the Dwell control 234b may set the segment selection control 236 to Dwell, and activating the Step control 234c may set the segment selection control 234 to Step. As will be described below, selecting a segment type in the segment selection control 236 will cause the display of any parameters required to be entered for the selected segment type.

The profile builder panel 224 also includes segment editor controls 238. The segment editor controls 238 cause the addition, modification, or deletion of a selected segment. For example, a user may select a command in the command sequence 230, and then select a segment type using the segment selection control 236. After inputting any parameters associated with the selected segment type, the user may activate an insert control 238a, causing the selected segment and corresponding parameters to be added to the command sequence 230 before (or, in embodiments, after) the selected command. Likewise, selecting a command in the command sequence, modifying the parameter values associated with the selected command and, thereafter, activating a modify control 238b will cause the modification of the command in the command sequence 230. Lastly, selecting a command in the command sequence and activating a delete control 238c will cause the selected command in the command sequence to be deleted.

Figure 5:
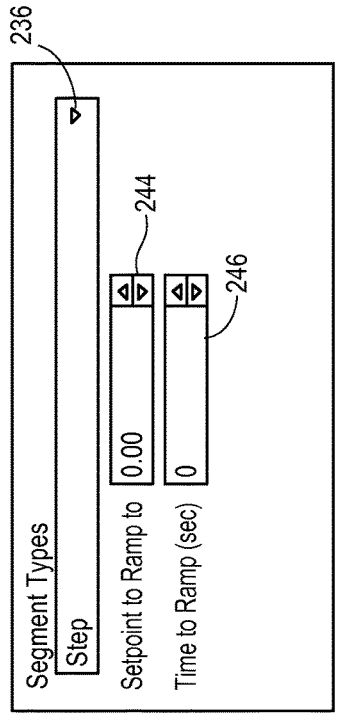
FIG. 5 depicts a Step segment selected in the profile builder panel of FIG. 4.

FIGS. 5-17 depict examples of segment types that may be selected in the profile builder panel 24. While various parameters are described as associated with each segment type, the following examples are non-limiting examples. Other segment types than those described may be included, fewer or more segment types may be included, and the parameter values associated with each segment type may be different and/or greater/fewer in number, in various embodiments. Turning now to FIG. 5, for example, the segment selection control 236 illustrates that a Step segment type is selected. The Step segment type could have been selected by use of the control 236 or, alternatively, by activation of the control 234c. In any event, selection of the Step segment type causes the profile builder panel 234 to display a parameter value entry field 240. The parameter value entry field 240 accepts an input of a setpoint to which the regulator 100 will be set, by way of a step function, when the on-board controller 154 executes the command. The entry field 240 may be a manual text entry field, a pull-down field, may include incremental increase/decrease buttons 242, etc. Any appropriate entry field type may be used.

Figure 6:
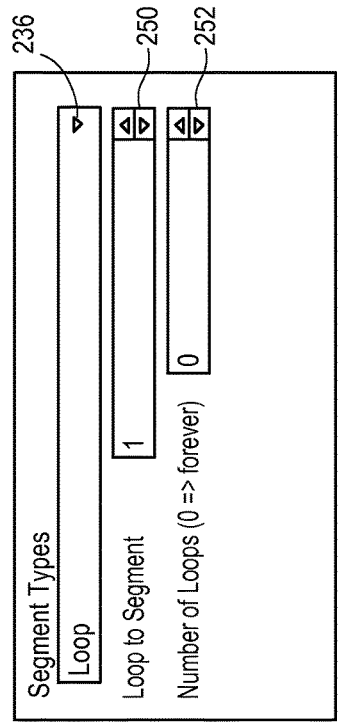
FIG. 6 depicts a Ramp segment selected in the profile builder panel of FIG. 4.

FIG. 6 depicts a Ramp segment type selected in the segment selection control 236. The Ramp segment type could have been selected by use of the control 236 or, alternatively, by activation of the control 234a. In any event, selection of the Ramp segment type causes the profile builder panel 234 to display parameter value entry fields 244 and 246. The field 244 accepts an input of a setpoint to which the regulator 100 will be set, according to a ramp function, when the on-board controller 154 executes the command. The field 246 accepts an input of a time period over which the ramp up to (or down to) the new setpoint specified in field 244 will occur.

Figure 7:
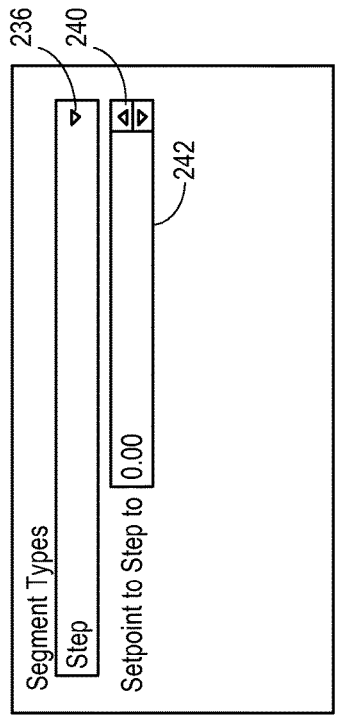
FIG. 7 depicts a Dwell segment selected in the profile builder panel of FIG. 4.

FIG. 7 depicts a Dwell segment type selected in the segment selection control 236. The Dwell segment type could have been selected by use of the control 236 or, alternatively, by activation of the control 234b. In any event, selection of the Dwell segment type causes the profile builder panel 234 to display a parameter value entry field 248, that accepts an input of a dwell time (i.e., a time for which the on-board processor 154 will maintain the current setpoint).

Figure 8:
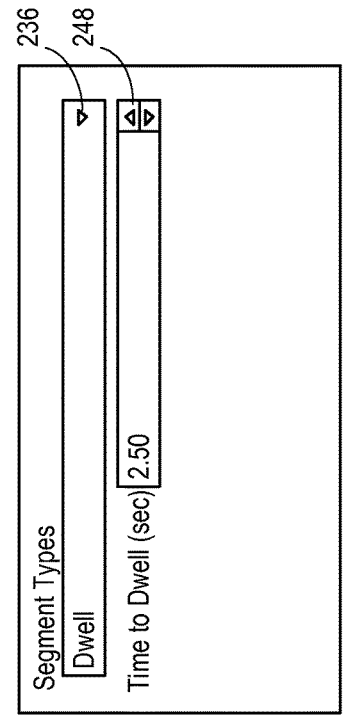
FIG. 8 depicts a Loop segment selected in the profile builder panel of FIG. 4.

A Loop segment type is selected in the segment selection control 236 depicted in FIG. 8. Selection of the Loop segment type causes the profile builder panel 234 to display parameter value entry fields 250 and 252. The Loop segment type causes the on-board processor 154 on the regulator 100 to loop multiple times through a sequence of command segments. In the depicted example, the parameter value entry field 250 accepts a value for a segment at the start of the loop, while the parameter value entry field 250 accepts a value for a number of times to perform the loop. In embodiments, the field 250 may instead indicate an end segment for the loop.

Figure 9:
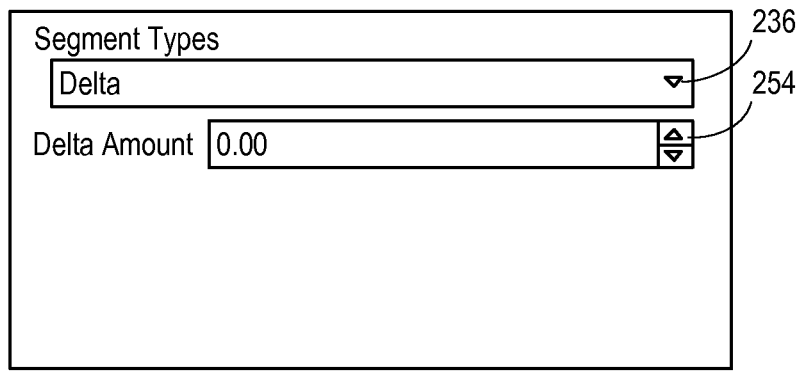
FIG. 9 depicts a Delta segment selected in the profile builder panel of FIG. 4.

In FIG. 9, a Delta segment type is selected in the segment selection control 236. The Delta segment type causes the on-board processor 154 of the regulator 100 to initiate a step setpoint change by the percentage value entered in a parameter value entry field 254. For example, a value of 50% in the parameter value entry field 254 would cause (upon execution by the on-board controller 154 of the regulator 100) the setpoint to decrease, stepwise, to 50% of the current value of the setpoint (e.g., step down from 100 PSI to 50 PSI).

Figure 10:
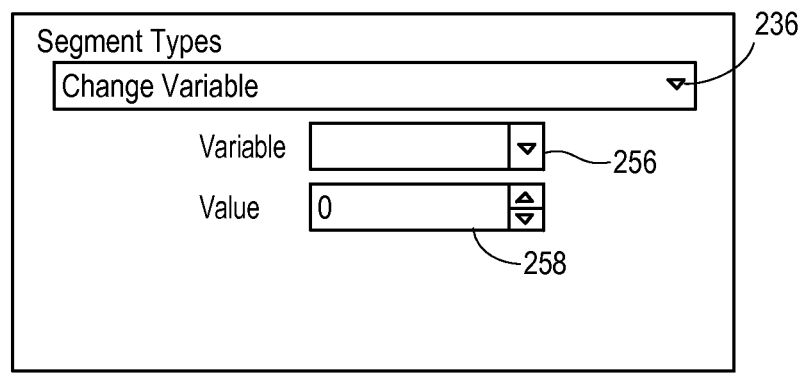
FIG. 10 depicts a Change Variable segment selected in the profile builder panel of FIG. 4.

A Change Variable segment type is depicted in FIG. 10 as selected in the segment selection control 236. The Change variable segment type causes an internal variable of the regulator 100 to be changed to a specified value. A parameter value input field 256 accepts an input of a variable to modify, while a parameter value input field 258 accepts an input of a new value for the variable. The parameter value input field 256 is depicted in FIG. 10 as a dropdown list, but could be any type of input field.

Figure 11:
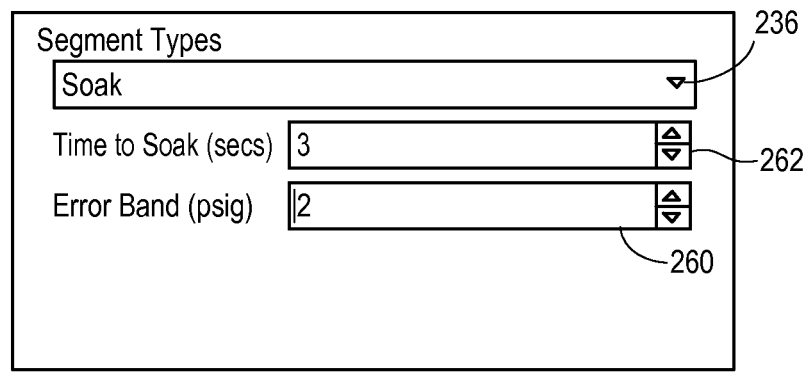
FIG. 11 depicts a Soak segment selected in the profile builder panel of FIG. 4.

FIG. 11 depicts a Soak command selected in the segment selection control 236. The Soak segment type, when executed by the on-board controller 154, pauses the multi-step command sequence while the regulator 100 responds to a step setpoint change, then dwells at the new setpoint for a specified amount of time. A parameter value input field 260 may accept a value that sets a range (above/below) the setpoint and, when the feedback falls within the set range, the regulator 100 maintains the new setpoint for a time value entered into a parameter value input field 262.

Figure 12:
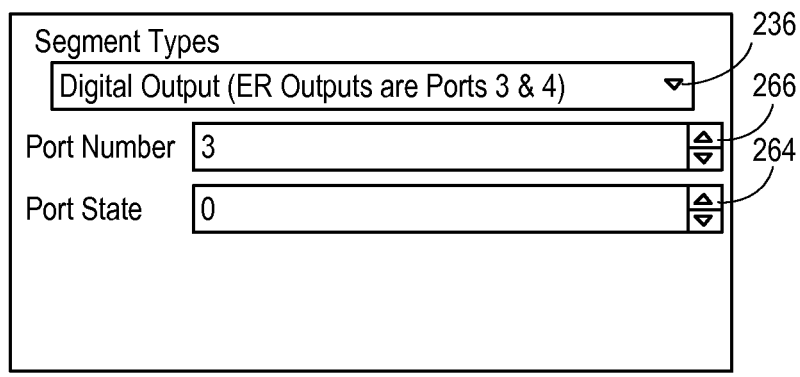
FIG. 12 depicts a Digital Output segment selected in the profile builder panel of FIG. 4.
Figure 13:
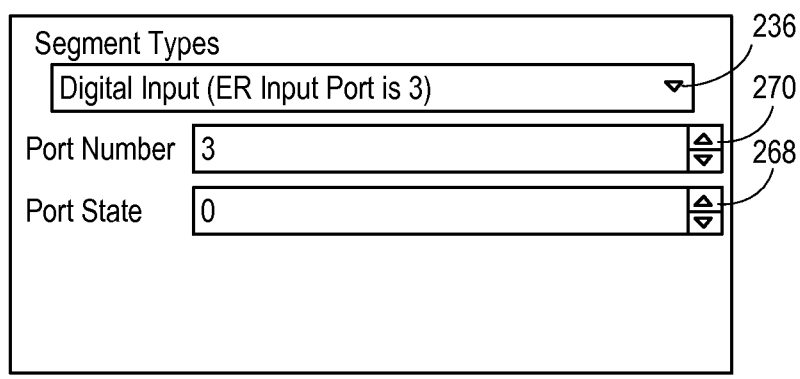
FIG. 13 depicts a Digital Input segment selected in the profile builder panel of FIG. 4.

FIGS. 12 and 13 depict, respectively, a Digital Output segment type and a Digital Input segment type selected in the segment selection control 236. The former sends a trigger to a process in another part of the system, output a signal, specified in a parameter value input field 264 on a digital output port of the regulator 100 specified in a parameter value input field 266. Similarly, the Digital Input segment type pauses the execution of the profile until an input value specified in a parameter value input field 268 is received on a digital port specified in a parameter value input field 270.

Figure 15:
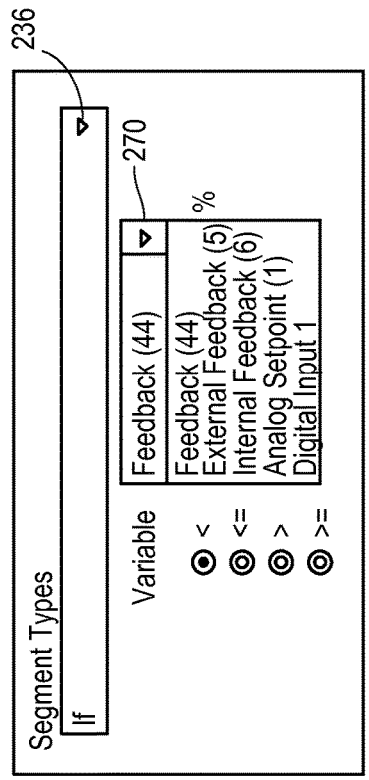
FIGS. 14-16 depict examples of an If segment selected in the profile builder panel of FIG. 4.
Figure 14:
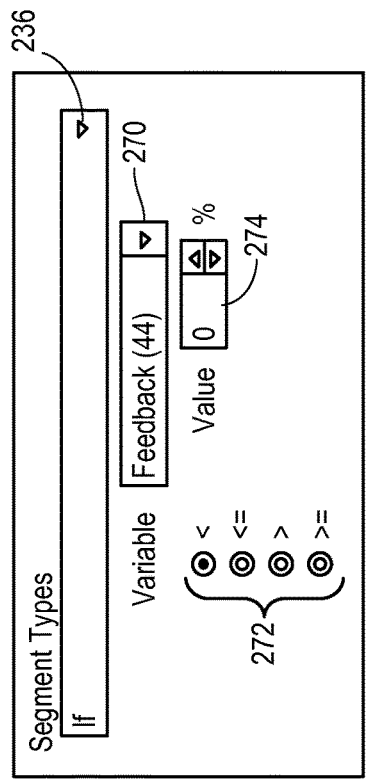
Figure 16:
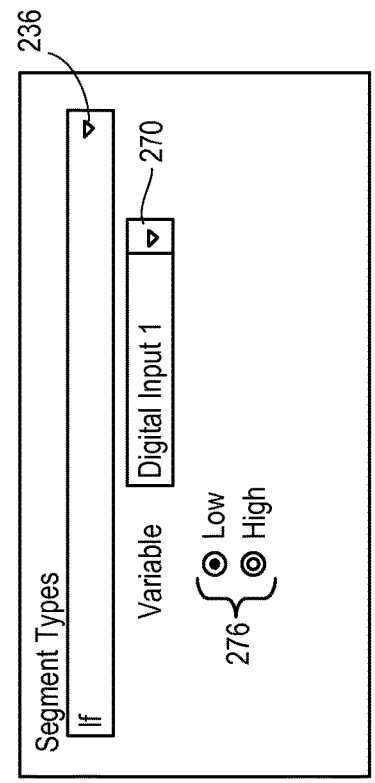

In FIG. 14, the segment selection control 236 is set to an If segment type. The If segment type facilitates response of the on-board controller 154 to the current state of the regulator 100 and its surroundings. Specifically, the If segment type causes the on-board controller 154 to evaluate whether a parameter of the current system status matches a predetermined condition. The predetermined condition is specified using a variable input field 270, an operator input field 272, and a value field 274, for some variables. For other variables, the predetermined condition is specified using the variable input field 270, and a binary value selection 276, as depicted in FIG. 16. In FIG. 15, a variety of conditions are visible in the pulldown menu associated with the variable. The variables that can be selected for evaluation using the If segment type include internal feedback (e.g., the sensor 140), external feedback (e.g., the sensor 106), an analog setpoint value, etc. Other variables may be available in other embodiments, as the examples depicted in FIG. 15 are merely exemplary. The operator input field 272 allows the user to specify the type of comparison for a non-binary value (e.g., greater than, less than, greater than or equal to, less than or equal to, equal to, etc.). Where the value of the selected variable is a binary value, as in the case of a digital input (which can have values high and low, 1 and 0, etc.), the binary value selection 276 allows the user to select the desired value that evaluates to "true."

In some embodiments, when the on-board controller 154 of the regulator 100 executes an If statement, the controller 154 evaluates the statement and, if the statement is true, executes the next consecutive command segment in the profile. If the statement evaluates to "false," then the next consecutive command segment in the profile is skipped. In other embodiments, the opposite may be true—an evaluation of "false" may result in execution of the next consecutive command segment, while the evaluation to "true" may result in skipping the next consecutive segment. In some embodiments, an additional parameter value input field (not shown) allows a user to set whether true statements or false statements result in execution of the next consecutive command segment in a profile.

Figure 17:
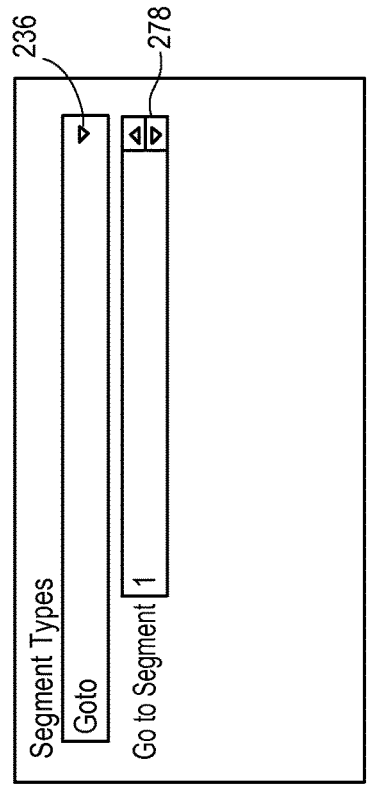
FIG. 17 depicts a Goto segment selected in the profile builder panel of FIG. 4.

Goto is an additional segment type that may be selected using the segment selection control 236, as FIG. 17 illustrates. Selection of the Goto segment type results in the display of a parameter value input field 278 accepting an input of a segment to execute next. The Goto segment type is a branching segment type that generally results in skipping one or more segments between the current segment and the segment number indicated in the input field 278.

Figure 18:
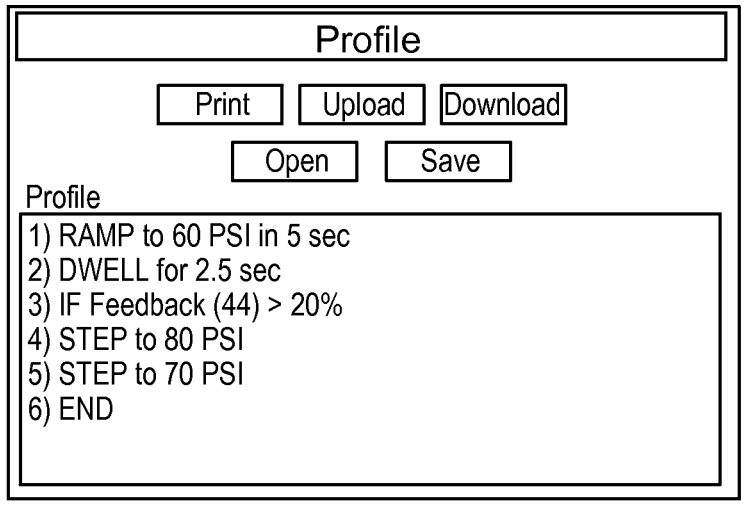
FIG. 18 depicts a first exemplary profile built using the profile builder panel.
Figure 19:
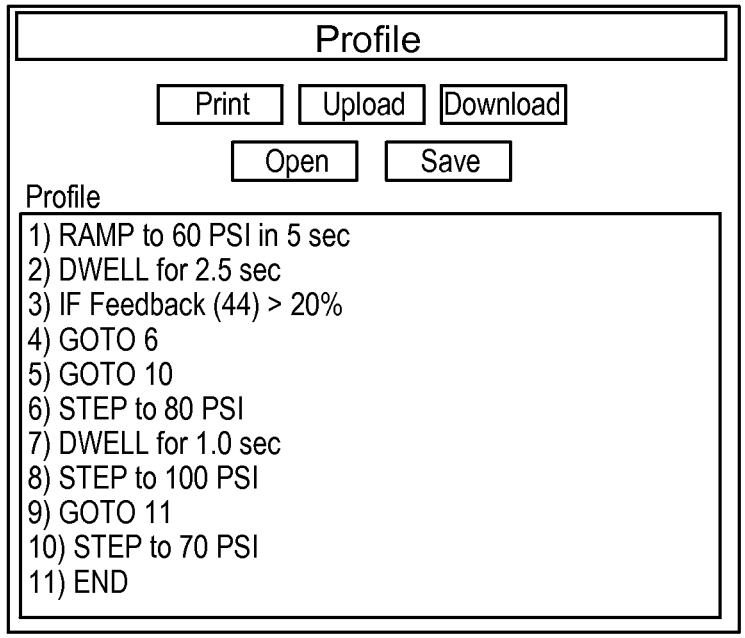
FIG. 19 depicts a second exemplary profile built using the profile builder panel.

FIGS. 18 and 19 illustrate example profiles implementing the If and Goto segment types in an embodiment. In FIG. 18, the third segment (3) includes an if statement that evaluates statement Feedback >20%. The on-board controller 154 executing command segment 3 in the profile depicted in FIG. 18 would compare the value of the signal "Feedback" to 20%. The statement would evaluate to "true" if the value of "Feedback" is greater than (>) 20%, and "false" if the value of "Feedback" is less than or equal to 20%. If segment 3 evaluates to "true," the on-board controller 154 would execute the next command segment in the profile (segment 4—"STEP to 80 PSI"). If, on the other hand, segment 3 evaluates to "false," the on-board controller 154 would skill the next command segment in the profile (segment 4) and would, instead, execute the following command segment (segment 5—"STEP to 70 PSI").

In FIG. 19, the third segment (3) again includes an If statement that evalues statement Feedback >20%. Once again, the on-board controller 154 executing command segment 3 in the profile depicted in FIG. 19 would compare the value of the signal "Feedback" to 20%. The statement would evaluate to "true" if the value of "Feedback" is greater than (>) 20%, and "false" if the value of "Feedback" is less than or equal to 20%. In FIG. 19, however, if segment 3 evaluates to "true," the on-board controller 154 would execute the next command segment in the profile (segment 4—"GOTO 6"). The command "GOTO 6" would cause the on-board controller 154 to skip segment 5 and resume execution with segment 6. The controller 154 would execute subsequent commands until executing segment 9 ("GOTO 11"), after which the controller 154 would go to the "END" segment. If, on the other hand, segment 3 evaluates to "false," the on-board controller 154 would skip the next command segment in the profile (segment 4) and would instead execute the next segment (segment 5—"GOTO 10"). The command "GOTO 10" would cause the controller 154 to skip segments six through nine, and resume execution with segment 10. As can be seen from these examples, the controller 154 will execute profile segments 1-4, 6-9, and 11 if "Feedback >20%" evaluates to true, and will execute profile segments 1-3, 5, 10, and 11 if "Feedback >20%" evaluates to false.

Figure 20:
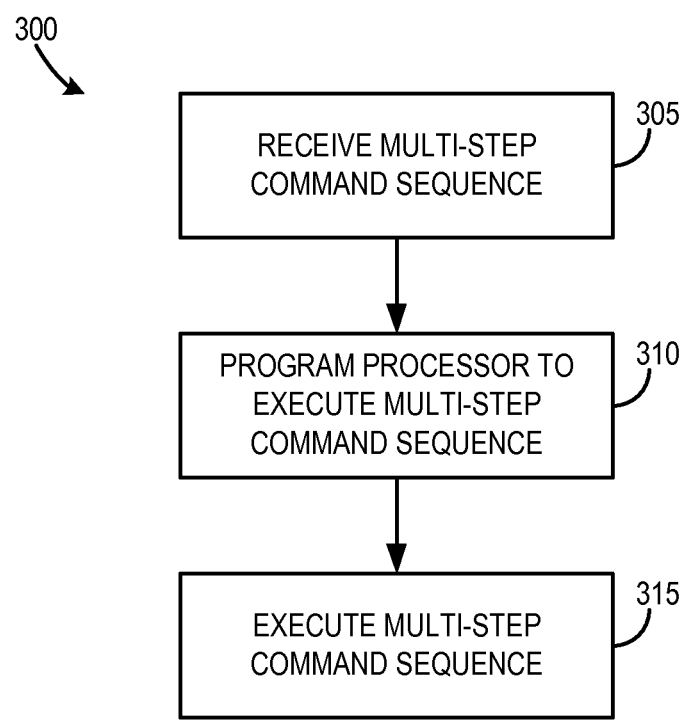
FIG. 20 is a flow chart depicting an example method of controlling an electronic pressure regulator in accordance with the present description.

Turning now to FIG. 20, a flow diagram depicts an example method 300 of controlling the electronic pressure regulator 100. The processor of the on-board controller 154 receives a multi-step command sequence via an electronic connection (block 305). The electronic connection can be a wireless connection, such as a WiFi connection (or any other connection conforming to an IEEE 802.11 protocol or any wireless data transmission protocol) or a wired connection, such as a USB connection. The processor is programmed to execute the multi-step sequence (block 310) and, when put into operation, executes the multi-step sequence (block 315).

In an embodiment, the multi-step command sequence includes at least one conditional statement that causes the processor to execute a first command if the conditional statement evaluates to "true" and to execute a second command instead of the first command if the conditional statement evaluates to "false." In embodiments, the first command is a command immediately following the conditional statement and the second command is a command immediately following the first command. In other embodiments, the second command is a command immediately following the conditional statement and the first command is a command immediately following the second command. The conditional statement may be an "if" statement, that executes the command following the "if" statement if the conditional statement is true, and skips the command following the "if" statement if the conditional statement is false. The conditional statement may include a comparison of any of an internal sensor, an external sensor, a value received as a digital signal, or a value received as an analog signal.

In some embodiments, the multi-step command sequence includes at least one branching statement. The branching statement is a "goto" command, in some embodiments, that causes the processor executing the multi-step command sequence to skip one or more commands in the sequence and resume execution of the sequence at a later command in the sequence.

In embodiments, a first command following the conditional statement may be a first branching statement, such as a first "goto" command, and a second command following the first command may be a second branching statement, such as a second "goto" command.

Figure 21:
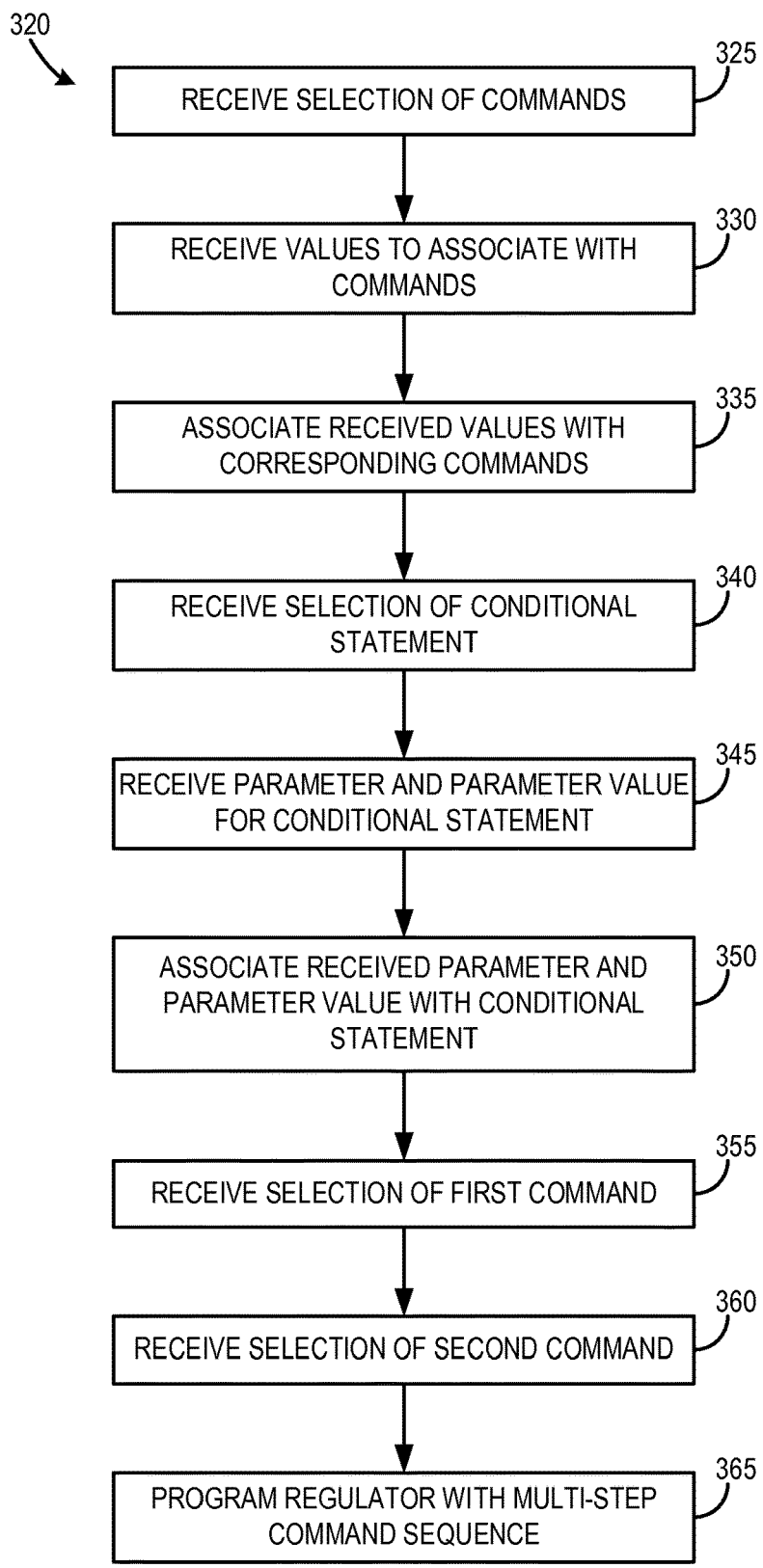
FIG. 21 is a flow chart depicting an example method of programming an electronic pressure regulator in accordance with the present description.

A flow diagram in FIG. 21 depicts a method 320 for programming an electronic pressure regulator. The method is a computer-implemented method implemented by software instructions stored on a computer-readable medium (excluding transitory signals) and executed by a processor of, for example, the computer 108. The processor receives a selection of a plurality of commands selected from a set of available commands to form a multi-step command sequence (block 325). The processor also receives user-defined values to associate with each of the plurality of selected commands (block 330), and associates the received user-defined values with the corresponding selected commands (block 335). The processor receives, as one of the plurality of commands, a selection of a conditional statement (block 340), receives for the conditional statement a selection of a parameter and a parameter value (block 345), and associates the received parameter and the received parameter value with the conditional statement (block 350). The processor receives a selection of a first command to be executed if the conditional statement evaluates as true (block 355) and receives a selection of a second command to be executed if the conditional statement evaluates as false (block 360). Then the processor programs the electronic pressure regulator to execute the multi-step command sequence (block 365). It is noted that in embodiments, some of the steps recited above are omitted, combined, supplemented, or reordered.

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the applications, services, engines, routines, and modules described herein may be stored in any tangible, non-transitory computer readable memory such as on a magnetic disk, a laser disk, solid state memory device, molecular memory storage device, an optical disk, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The following aspects represent examples of embodiments of the presently described methods and systems. This list of aspects is intended to be non-limiting, as other embodiments are clearly contemplated in view of the present description.

1. An electronic pressure regulator comprising: a regulator body having an inlet port coupled to a source of supply pressure, an outlet port for outputting a controlled pressure, and an exhaust port; an inlet valve coupled at an input of the inlet valve to the supply pressure and at an output of the inlet valve to the outlet port; an outlet valve coupled at an input of the outlet valve to the outlet port and at an output of the outlet valve to the exhaust port; and a controller disposed within the regulator body and operable to actuate the inlet valve and the outlet valve to adjust the controlled pressure delivered to the outlet port, the controller comprising a processor programmed to receive and execute a multi-step command sequence that includes a conditional statement causing the processor to execute a first command if the conditional statement evaluates to true and a second command if the conditional statement evaluates to false.

2. An electronic pressure regulator according to aspect 1, wherein the processor is programmed to receive and execute a multi-step command sequence that includes as either the first command or the second command a branch statement that causes the processor to execute a non-consecutive command.

3. An electronic pressure regulator according to aspect 2, wherein the branch statement is a GOTO statement.

4. An electronic pressure regulator according to any one of the preceding aspects, wherein the conditional statement is an IF statement.

5. An electronic pressure regulator according to any one of the preceding aspects, wherein the first command is consecutive to the conditional statement and wherein the second command is consecutive to the first command.

6. An electronic pressure regulator according to any one of aspects 1 to 4, wherein the second command is consecutive to the conditional statement and wherein the first command is consecutive to the second command.

7. An electronic pressure regulator according to any one of the preceding aspects, wherein processor is programmed to receive and execute a multi-step command sequence that causes the process to change a setpoint of the regulator.

8. An electronic pressure regulator according to any one of the preceding aspects, wherein processor is programmed to receive and execute a multi-step command sequence that includes a ramp command.

9. An electronic pressure regulator according to any one of the preceding aspects, wherein processor is programmed to receive and execute a multi-step command sequence that includes a step command.

10. An electronic pressure regulator according to any one of the preceding aspects, wherein processor is programmed to receive and execute a multi-step command sequence that includes a dwell command.

11. An electronic pressure regulator according to any one of the preceding aspects, wherein processor is programmed to receive and execute a multi-step command sequence that includes a loop command.

12. An electronic pressure regulator according to any one of the preceding aspects, wherein processor is programmed to receive and execute a multi-step command sequence that includes a delta command.

13. An electronic pressure regulator according to any one of the preceding aspects, wherein processor is programmed to receive and execute a multi-step command sequence that includes a soak command.

14. An electronic pressure regulator according to any one of the preceding aspects, wherein processor is programmed to receive and execute a multi-step command sequence that includes a command causing the controller to output an electrical or electronic signal to another device.

15. An electronic pressure regulator according to any one of the preceding aspects, wherein processor is programmed to receive and execute a multi-step command sequence that includes a command causing the controller to wait for a specified input to reach a specified value or state before executing further commands.

16. An electronic pressure regulator according to any one of the preceding aspects, wherein the controller further comprises a sensor input.

17. An electronic pressure regulator according to aspect 16, wherein the sensor input receives a signal from a sensor sensing the controlled pressure.

18. An electronic pressure regulator according to aspect 16, wherein the sensor input receives a signal from a sensor sensing a value of a parameter controlled by the controlled pressure.

19. An electronic pressure regulator according to either aspect 16 or aspect 17, wherein the processor is programmed to execute a multi-step command sequence that includes a conditional statement comparing a value received via the sensor input to a comparison value.

20. An electronic pressure regulator according to either aspect 16 or aspect 17, wherein the processor is programmed to execute a multi-step command sequence that includes a conditional statement comparing a value received from an external device to a comparison value.

21. A method of controlling an electronic pressure regulator, the method comprising: receiving at a processor disposed within a body of the regulator, via an electronic connection, a multi-step command sequence; programming the processor to execute the multi-step command sequence; and executing the multi-step command sequence, wherein the multi-step command sequence includes a conditional statement causing the processor to execute a first command if the conditional statement evaluates to true and a second command if the conditional statement evaluates to false.

22. A method according to aspect 21, wherein programming the processor to execute the multi-step command sequence comprises programming the processor to execute a multi-step command sequence that includes as either the first command or the second command a branch statement that causes the processor to execute a non-consecutive command.

23. A method according to aspect 22, wherein the branch statement is a GOTO statement.

24. A method according to any one of aspects 21 to 23, wherein the conditional statement is an IF statement.

25. A method according to any one of aspects 21 to 24, wherein programming the processor to execute the multi-step command sequence comprises programming the processor to execute a command immediately following the conditional statement if the conditional statement evaluates to true, and to skip the command immediately following the conditional statement if the conditional statement evaluates to false.

26. A method according to any one of aspects 21 to 24, wherein programming the processor to execute the multi-step command sequence comprises programming the processor to execute a command immediately following the conditional statement if the conditional statement evaluates to false, and to skip the command immediately following the conditional statement if the conditional statement evaluates to true.

27. A method according to any one of aspects 21 to 26, wherein programming the processor to execute the multi-step command sequence comprises programming the processor to execute a command that causes the controller to output an electrical or electronic signal to another device.

28. A method according to any one of aspects 21 to 27, wherein programming the processor to execute the multi-step command sequence comprises programming the processor to evaluate a conditional statement comparing a sensor input value to a comparison value.

29. A method according to any one of aspects 21 to 28, wherein programming the processor to execute the multi-step command sequence comprises programming the processor to evaluate a conditional statement comparing a value received from an external device to a comparison value.

30. A method according to any one of aspects 21 to 29, wherein programming the processor to execute the multi-step command sequence comprises programming the processor to evaluate a conditional statement comparing the value of a sensor disposed within the body of the regulator to a comparison value.

31. A computer-implemented method of programming an electronic pressure regulator, the method comprising: receiving a selection of a plurality of commands selected from a set of available commands, the plurality of commands forming a multi-step command sequence; receiving user-defined values to associate with each of the plurality of selected commands; associating the received user-defined values with the corresponding selected commands; receiving a selection, as one of the plurality of commands, of a conditional statement; receiving for the conditional statement a selection of a parameter and a parameter value; associating the received parameter and the received parameter value with the conditional statement; receiving a selection, as one of the plurality of commands, of a first command to be executed if the conditional statement evaluates to true; receiving a selection, as one of the plurality of commands, of a second command to be executed if the conditional statement evaluates to false; and programming the electronic pressure regulator to execute the multi-step command sequence.

32. A computer-implemented method according to aspect 31, wherein receiving a selection of a conditional statement comprises receiving a selection of an IF statement.

33. A computer-implemented method according to either aspect 31 or aspect 32, wherein: receiving a selection of a first command to be executed if the conditional statement evaluates to true comprises receiving a selection of a GOTO command; or receiving a selection of a second command to be executed if the conditional statement evaluates to false comprises receiving a selection of a GOTO command.

34. A computer-implemented method according to any one of aspects 31 to 33, wherein associating the received parameter and the received parameter value with the conditional statement comprises associating the conditional statement with a sensor output.

35. A computer-implemented method according to aspect 34, wherein associating the conditional statement with a sensor output comprises associating the conditional statement with an output of a sensor within the regulator.

36. A computer-implemented method according to aspect 34, wherein associating the conditional statement with a sensor output comprises associating the conditional statement with an output of a sensor external to the regulator.

37. A computer-implemented method according to any one of aspects 31 to 36, wherein associating the received parameter and the received parameter value with the conditional statement comprises associating the conditional statement with a signal received from an external device.

38. A computer-implemented method according to any one of aspects 31 to 37, wherein the first command is consecutive to the conditional statement and wherein the second command is consecutive to the first command.

39. A computer-implemented method according to any one of aspects 31 to 37, wherein the second command is consecutive to the conditional statement and wherein the first command is consecutive to the second command.

40. A computer-implemented method according to any one of aspects 31 to 39, wherein the first command or the second command comprises a command to change a setpoint of the regulator.

41. A computer-implemented method according to any one of aspects 31 to 40, wherein the first command or the second command comprises a command to output an electrical or electronic signal from the regulator to another device.

What is claimed is:

1. An electronic pressure regulator assembly comprising:
   a pilot valve body having an inlet port coupled to a source of supply pressure, an outlet port for outputting to a regulator body a controlled pressure, and an exhaust port;
   an inlet valve coupled at an input of the inlet valve to the supply pressure and at an output of the inlet valve to the outlet port;
   an outlet valve coupled at an input of the outlet valve to the outlet port and at an output of the outlet valve to the exhaust port;
   a re-programmable controller disposed within the pilot valve body and operable to actuate the inlet valve and the outlet valve to adjust the controlled pressure delivered to the outlet port, the controller comprising a processor programmed to receive and execute a user-constructed profile, the profile comprising a multi-step command sequence configured to cause the regulator to make a series of prescribed pressure adjustments over time, the multi-step command sequence including a conditional statement causing the processor to execute a first command if the conditional statement evaluates to true and a second command if the conditional statement evaluates to false; and
   communication means configured to receive from an external device a second profile and to cause the controller to be re-programmed with the second profile.

2. An electronic pressure regulator assembly according to claim 1, wherein the processor is programmed to receive and execute a multi-step command sequence that includes as either the first command or the second command a branch statement that causes the processor to execute a non-consecutive command.

3. An electronic pressure regulator assembly according to claim 2, wherein the branch statement is a GOTO statement.

4. An electronic pressure regulator assembly according to claim 1, wherein the conditional statement is an IF statement.

5. An electronic pressure regulator assembly according to claim 1, wherein the first command is consecutive to the conditional statement and wherein the second command is consecutive to the first command.

6. An electronic pressure regulator assembly according to claim 1, wherein the second command is consecutive to the conditional statement and wherein the first command is consecutive to the second command.

7. An electronic pressure regulator assembly according to claim 1, wherein processor is programmed to receive and execute a multi-step command sequence that causes the process to change a setpoint of the regulator.

8. An electronic pressure regulator assembly according to claim 1, wherein processor is programmed to receive and execute a multi-step command sequence that includes a ramp command.

9. An electronic pressure regulator assembly according to claim 1, wherein processor is programmed to receive and execute a multi-step command sequence that includes a step command.

10. An electronic pressure regulator assembly according to claim 1, wherein processor is programmed to receive and execute a multi-step command sequence that includes a dwell command.

11. An electronic pressure regulator assembly according to claim 1, wherein processor is programmed to receive and execute a multi-step command sequence that includes a loop command.

12. An electronic pressure regulator assembly according to claim 1, wherein processor is programmed to receive and execute a multi-step command sequence that includes a delta command.

13. An electronic pressure regulator assembly according to claim 1, wherein processor is programmed to receive and execute a multi-step command sequence that includes a soak command.

14. An electronic pressure regulator assembly according to claim 1, wherein processor is programmed to receive and execute a multi-step command sequence that includes a command causing the controller to output an electrical or electronic signal to another device.

15. An electronic pressure regulator assembly according to claim 1, wherein processor is programmed to receive and execute a multi-step command sequence that includes a command causing the controller to wait for a specified input to reach a specified value or state before executing further commands.

16. An electronic pressure regulator assembly according to claim 1, wherein the controller further comprises a sensor input.

17. An electronic pressure regulator assembly according to claim 16, wherein the sensor input receives a signal from a sensor sensing the controlled pressure.

18. An electronic pressure regulator assembly according to claim 16, wherein the sensor input receives a signal from a sensor sensing a value of a parameter controlled by the controlled pressure.

19. An electronic pressure regulator assembly according to claim 16, wherein the processor is programmed to execute a multi-step command sequence that includes a conditional statement comparing a value received via the sensor input to a comparison value.

20. An electronic pressure regulator assembly according to claim 16, wherein the processor is programmed to execute a multi-step command sequence that includes a conditional statement comparing a value received from an external device to a comparison value.

21. A method of controlling an electronic pressure regulator assembly, the method comprising:
receiving at a processor disposed within a body of a pilot valve, via an electronic connection, a first profile comprising a multi-step command sequence for controlling the pilot pressure supplied to a regulator body, the first profile configured to cause the regulator to make a first series of prescribed pressure adjustments over time;
programming the processor to execute the multi-step command sequence;
executing the multi-step command sequence;
receiving at the processor, via the electronic connection, a second profile comprising a second multi-step command sequence for controlling the pilot pressure supplied to the regulator body, the second profile configured to cause the regulator to make a second series of prescribed pressure adjustments over time;
programming the processor to execute the second multi-step command sequence; and
executing the second multi-step command sequence to control the pilot pressure supplied to the regulator body,
wherein each of the multi-step command sequence and the second multi-step command sequence includes a respective conditional statement causing the processor to execute a respective first command if the conditional statement evaluates to true and a respective second command if the conditional statement evaluates to false.

22. A method according to claim 21, wherein programming the processor to execute the multi-step command sequence comprises programming the processor to execute a multi-step command sequence that includes as either the first command or the second command a branch statement that causes the processor to execute a non-consecutive command.

23. A method according to claim 22, wherein the branch statement is a GOTO statement.

24. A method according to claim 21, wherein the conditional statement is an IF statement.

25. A method according to claim 21, wherein programming the processor to execute the multi-step command sequence comprises programming the processor to execute a command immediately following the conditional statement if the conditional statement evaluates to true, and to skip the command immediately following the conditional statement if the conditional statement evaluates to false.

26. A method according to claim 21, wherein programming the processor to execute the multi-step command sequence comprises programming the processor to execute a command immediately following the conditional statement if the conditional statement evaluates to false, and to skip the command immediately following the conditional statement if the conditional statement evaluates to true.

27. A method according to claim 21, wherein programming the processor to execute the multi-step command sequence comprises programming the processor to execute a command that causes the controller to output an electrical or electronic signal to another device.

28. A method according to claim 21, wherein programming the processor to execute the multi-step command sequence comprises programming the processor to evaluate a conditional statement comparing a sensor input value to a comparison value.

29. A method according to claim 21, wherein programming the processor to execute the multi-step command sequence comprises programming the processor to evaluate a conditional statement comparing a value received from an external device to a comparison value.

30. A method according to claim 21, wherein programming the processor to execute the multi-step command sequence comprises programming the processor to evaluate a conditional statement comparing the value of a sensor disposed within the body of the regulator to a comparison value.

31. A computer-implemented method of programming a pilot valve of an electronic pressure regulator assembly, the method comprising:
facilitating with a graphical user interface (GUI) the creation of one or more user-defined profiles, each profile comprising a multi-step, sequential command sequence for controlling the pilot valve to cause a regulator of the regulator assembly to make a series of prescribed pressure adjustments over time, wherein the creation of each of the one or more user-defined profiles comprises:
receiving from a user, via the GUI, a selection of a plurality of commands selected from a set of available commands, the plurality of commands forming a multi-step command sequence;
receiving from the user, via the GUI, user-defined values to associate with each of the plurality of selected commands;
associating the received user-defined values with the corresponding selected commands;
receiving from the user, via the GUI, a selection, as one of the plurality of commands, of a conditional statement;
receiving from the user, via the GUI, for the conditional statement a selection of a parameter and a parameter value;
associating the received parameter and the received parameter value with the conditional statement;
receiving from the user, via the GUI, a selection, as one of the plurality of commands, of a first command to be executed if the conditional statement evaluates to true; and
receiving from the user, via the GUI, a selection, as one of the plurality of commands, of a second command to be executed if the conditional statement evaluates to false; and
programming the pilot valve to execute the multi-step command sequence to control the regulator, by transmitting to the pilot valve the user-defined profile.

32. A computer-implemented method according to claim 31, wherein receiving a selection of a conditional statement comprises receiving a selection of an IF statement.

33. A computer-implemented method according to claim 31, wherein:
receiving a selection of a first command to be executed if the conditional statement evaluates to true comprises receiving a selection of a GOTO command; or
receiving a selection of a second command to be executed if the conditional statement evaluates to false comprises receiving a selection of a GOTO command.

34. A computer-implemented method according to claim 31, wherein associating the received parameter and the received parameter value with the conditional statement comprises associating the conditional statement with a sensor output.

35. A computer-implemented method according to claim 34, wherein associating the conditional statement with a sensor output comprises associating the conditional statement with an output of a sensor within the regulator assembly.

36. A computer-implemented method according to claim 34, wherein associating the conditional statement with a sensor output comprises associating the conditional statement with an output of a sensor external to the regulator assembly.

37. A computer-implemented method according to claim 31, wherein associating the received parameter and the received parameter value with the conditional statement comprises associating the conditional statement with a signal received from an external device.

38. A computer-implemented method according to claim 31, wherein the first command is consecutive to the conditional statement and wherein the second command is consecutive to the first command.

39. A computer-implemented method according to claim 31, wherein the second command is consecutive to the conditional statement and wherein the first command is consecutive to the second command.

40. A computer-implemented method according to claim 31, wherein the first command or the second command comprises a command to change a setpoint of the regulator.

41. A computer-implemented method according to claim 31, wherein the first command or the second command comprises a command to output an electrical or electronic signal from the regulator to another device.

* * * * *